United States Patent
Kim et al.

(10) Patent No.: US 9,158,397 B2
(45) Date of Patent: Oct. 13, 2015

(54) TOUCH INPUT APPARATUS AND METHOD IN USER TERMINAL

(71) Applicant: Samsung Electronics Co., Ltd., Gyeonggi-do (KR)

(72) Inventors: Ji-Hoon Kim, Seoul (KR); Jung-Rim Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 59 days.

(21) Appl. No.: 13/683,494

(22) Filed: Nov. 21, 2012

(65) Prior Publication Data

US 2013/0127758 A1    May 23, 2013

(30) Foreign Application Priority Data

Nov. 23, 2011    (KR) .................. 10-2011-0123230

(51) Int. Cl.
  *G06F 3/041*    (2006.01)
  *G06F 3/0488*   (2013.01)

(52) U.S. Cl.
  CPC ............ *G06F 3/041* (2013.01); *G06F 3/04883* (2013.01); *G06F 2203/04808* (2013.01)

(58) Field of Classification Search
  CPC ....... G06F 3/041; G06F 3/045; G06F 3/0485; G06F 1/3203; G06F 3/04883; G06F 2203/04808
  USPC ............................ 715/767; 345/175, 173, 174
  See application file for complete search history.

(56) References Cited

U.S. PATENT DOCUMENTS

| | | | |
|---|---|---|---|
| 6,958,749 B1* | 10/2005 | Matsushita et al. | 345/175 |
| 2005/0003870 A1* | 1/2005 | Nakano et al. | 455/575.1 |
| 2006/0284857 A1* | 12/2006 | Oh | 345/173 |
| 2008/0192021 A1* | 8/2008 | Lim et al. | 345/173 |
| 2008/0211785 A1* | 9/2008 | Hotelling et al. | 345/173 |
| 2009/0315867 A1* | 12/2009 | Sakamoto et al. | 345/184 |
| 2009/0322699 A1* | 12/2009 | Hansson | 345/174 |
| 2010/0295796 A1* | 11/2010 | Roberts et al. | 345/173 |
| 2012/0218203 A1* | 8/2012 | Kanki | 345/173 |
| 2012/0249472 A1* | 10/2012 | Hong et al. | 345/174 |
| 2013/0016126 A1* | 1/2013 | Wang et al. | 345/650 |

* cited by examiner

*Primary Examiner* — Dwayne Bost
*Assistant Examiner* — Chineyere Wills-Burns
(74) *Attorney, Agent, or Firm* — The Farrell Law Firm, P.C.

(57) ABSTRACT

A touch input apparatus and method in a user terminal is provided. The apparatus includes a touch input unit for generating a touch input event according to a touch of a user; a single or multi touch input determiner for entering a drawing mode according to the touch input event and determining one of a single touch input and a multi-touch input; a touch point sampling unit for performing a touch point sampling according to a single touch movement and providing a sample point for a drawing when there is a single touch input; and a multi-touch processor for, when there is a multi-touch input, entering a multi-touch mode and performing a multi-touch action including at least one of an enlargement, a reduction, and a movement of a drawing screen according to a multi-touch movement.

8 Claims, 7 Drawing Sheets

TOUCH INPUT APPARATUS AND METHOD IN USER TERMINAL

PRIORITY

This application claims priority under 35 U.S.C. §119(a) to Korean Application Serial No. 10-2011-0123230, which was filed in the Korean Intellectual Property Office on Nov. 23, 2011, the entire content of which is incorporated herein by reference.

BACKGROUND OF THE INVENTION

1. Field of the Invention

The present invention relates generally to a touch input apparatus and method, and more particularly, to a touch input apparatus and method in a user terminal.

2. Description of the Related Art

Various types of display devices have been recently developed and, user interface technologies for allowing a user to more conveniently use the display device have been applied.

Particularly, terminals equipped with a touch screen capable of performing both a display function and an input function recently have gained a lot of popularity, and accordingly, user interfaces of various touch types are now installed in terminals. A terminal equipped with the touch screen may include, for example, an electronic organizer, a mobile phone, a PDA, a TV, a notebook computer, a netbook, a desktop computer and the like, and a terminal requiring the display function and input function also has the touch screen in many cases. Such a touch user interface technology has been continuously developed and is implemented in such a manner that particular actions and functions are achieved by analyzing a motion of a finger.

The touch user interface technology is applied to a lot of functions and applications, and a representative example of the touch user interface technology corresponds to performing a drawing operation according to a touch input on the touch screen by the user.

When the drawing operation is performed according to the touch input by the user, a screen touch by the user is made on the touch screen and a touch movement is made according to a shape intended by the user, a letter, and a drawing, and accordingly, the drawing operation is performed.

That is, in conventional touch input apparatuses, when the user performs a touch input, the conventional touch input apparatus detects the touch input, determines an action of the user, and samples points according to a touch movement of the user. Further, the touch input apparatus provides the sampled points to a drawing processing apparatus to allow a drawing operation to be performed, and accordingly, a drawing by the screen touch is drawn.

In the conventional touch input apparatus, when the drawing operation is performed, a drawing can be drawn after the corresponding drawing is enlarged to perform a more precise drawing operation. However, for the enlargement, the user must press a separate button or enter a separate enlargement mode by performing a menu selection, which inconveniences the user. Further, when the user performs the drawing operation after enlarging the drawing, distortion may occur due to a difference in an enlargement magnification between the drawings before and after the enlargement.

Meanwhile, when the drawing operation is performed after the user moves (rotates) or reduces the corresponding drawing while performing the drawing operation, or when the user performs the drawing operation after the enlargement, the user must press a separate button or perform a menu selection to enter a corresponding mode, which inconveniences the user.

SUMMARY OF THE INVENTION

Accordingly, an aspect of the present invention provides a touch input apparatus and method which can perform an enlargement, a reduction, and a movement while performing a drawing operation only by a touch without a separation mode switching or button press.

Another aspect of the present invention provides a touch input apparatus and method which prevents distortion in images before and after the enlargement by enlarging the drawing according to an enlargement magnification and then controlling a touch point sampling when the drawing is enlarged and then a continuous drawing operation is performed.

In accordance with an aspect of the present invention, a touch input apparatus in a user terminal is provided. The touch input apparatus includes a touch input unit for generating a touch input event according to a touch of a user; a single or multi touch input determiner for entering a drawing mode according to the touch input event and determining one of a single touch input and a multi-touch input; a touch point sampling unit for performing a touch point sampling according to a single touch movement and providing a sample point for a drawing when there is a single touch input; and a multi-touch processor for, when there is a multi-touch input, entering a multi-touch mode and performing a multi-touch action including at least one of an enlargement, a reduction, and a movement of a drawing screen according to a multi-touch movement.

In accordance with another aspect of the present invention, a touch input method in a user terminal is provided. The touch input method includes generating a touch input event according to a touch of a user; entering a drawing mode according to the touch input event and determining one of a single touch input and a multi-touch input; performing a touch point sampling according to a single touch movement and providing a sample point for a drawing when there is a single touch input; and entering a multi-touch mode and performing a multi-touch action including at least one of an enlargement, a reduction, and a movement of a drawing screen according to a multi-touch movement when there is a multi-touch input.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE PRESENT INVENTION

Hereinafter, various embodiments of the present invention will be described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

The present invention provides a touch input apparatus which allows a user to draw a drawing, and perform an enlargement, a reduction, and a movement while drawing the drawing by using a single touch or a multi-touch. Particularly, in the present invention, when there is a multi-touch input while drawing the drawing by using the single touch, the multi-touch input is determined, an enlargement, a reduction, or a movement for the drawing drawn according to the determined multi-touch input is performed, and a continuous drawing according to the single touch can be made in a state where the enlargement, the reduction, or the movement has been performed. Further, in the present invention, when the drawing is drawn in a state where the drawing has been enlarged, a distortion of images before and after the enlargement is prevented by controlling a touch point sampling according to an enlargement magnification.

The present invention may be applied to any touch input apparatus as long as the touch input apparatus can perform the touch input such as the touch screen and the like. A configuration and an operation principle of the present invention will be described herein with respect to a case where the touch input apparatus is mounted to the user terminal. The user terminal may be, for example, an electronic organizer, a mobile phone, a PDA, a TV, a notebook computer, a netbook, a desktop computer and the like, and include a configuration of a touch input apparatus of FIG. 1.

Figure 1:
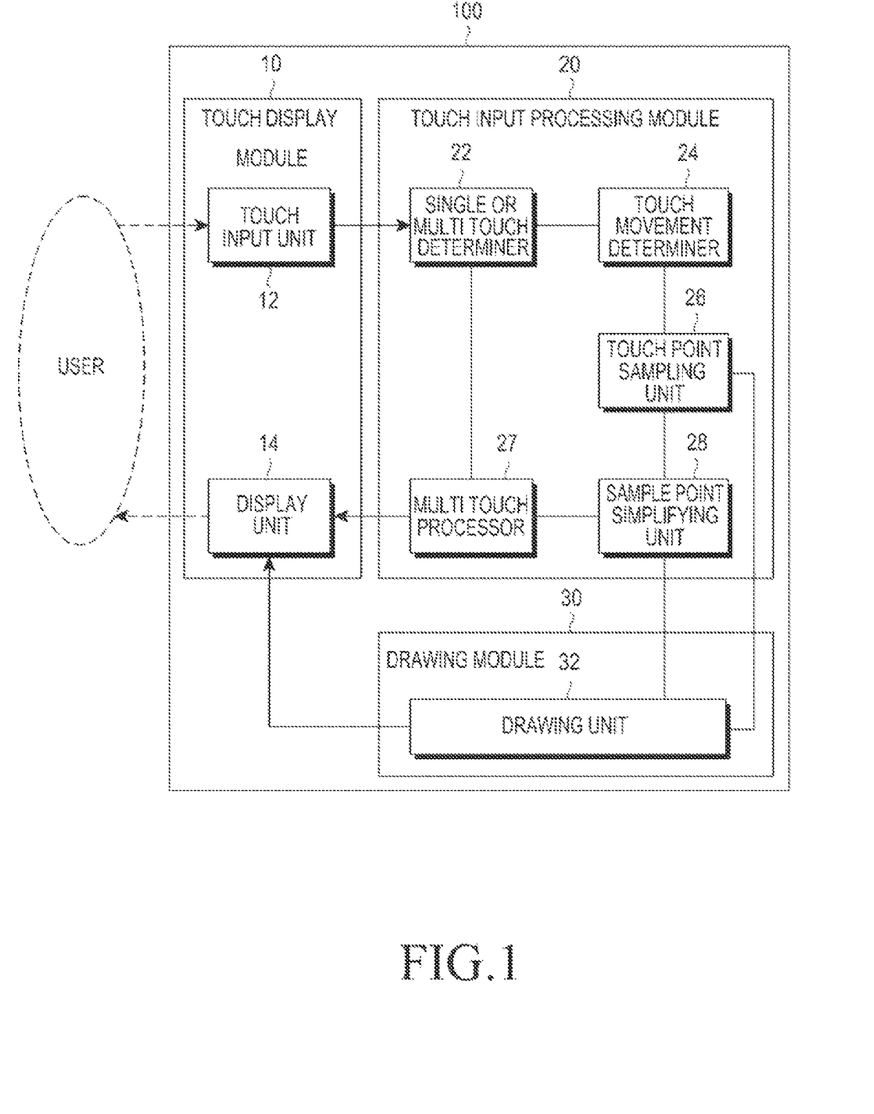
FIG. 1 illustrates a configuration of a touch input apparatus in a user terminal according to an embodiment of the present invention.

FIG. 1 illustrates a configuration of a touch input apparatus in a user terminal according to an embodiment of the present invention. Referring to FIG. 1, a user terminal 100 may include a touch display module 10, a touch input processing module 20, and a drawing module 30.

The touch display module 10 may be configured by a touch screen and the like capable of performing both a display function and an input function, and includes a touch input unit 12 and a display unit 14. The touch input unit 12 receives a touch from a user, and generates an input event according to the touch by an object such as a user's finger, a pen, a stylus or the like. Further, the touch input unit 12 generates a plurality of touch input events as well as a single touch input event. The display unit 14 may be configured by an LCD and the like, and displays various types of images by the user terminal 100 and more particularly, displays a drawn drawing, an enlarged drawing, a reduced drawing, or a drawing that has been moved according to the touch input by the user.

The touch input processing module 20 includes a single or multi touch determiner 22, a touch movement determiner 24, a touch point sampling unit 26, a multi-touch processor 27, and a sample point simplifying unit 28.

The single or multi touch determiner 22 receives an input event generated by the touch input unit 12 and determines whether the input event is a single touch input or a multi-touch input. For example, when one input event is input, the input event may be determined as the single touch input. When a plurality of input events are input at the same time, the input events may be determined as the multi-touch input.

The touch movement determiner 24 determines a touch movement according to a touch movement event generated when a touch input is performed and then the user moves his/her finger in a touched state, and provides touch points according to the touch movement to the touch point sampling unit 26.

The multi-touch processor 27 determines a multi-touch movement when a multi-touch input is determined by the touch input unit 12, and performs a predetermined enlargement, reduction, or movement operation according to a result of the determination of the multi-touch movement. For example, a screen enlargement operation is performed when a multi-touch movement of increasing a distance between two touch inputs is determined, and a screen reduction operation is performed when a multi-touch movement of decreasing the distance between the two touch inputs is determined. Further, when a multi-touch input of rotating the two touch inputs is determined, a screen rotation operation in a corresponding direction is performed.

The touch point sampling unit 26 samples touch points generated along the touch movement. The touch point sampling unit 26 may sample the touch points according to a predetermined sampling reference. The sample point simplifying unit 28 receives the touch points sampled by the touch point sampling unit 26 in a state where the screen has been enlarged by the multi-touch processor 27 and simplifies the sample points in accordance with a touch point sampling rate before the enlargement according to an enlargement magnification.

The drawing module 30 includes a drawing unit 32. The drawing module 30 receives the sampled touch points provided through the touch point sampling unit 26 and the sample point simplifying unit 28 to perform a drawing operation, and displays a drawing according to the drawing operation on the display unit 14.

Accordingly, the touch input apparatus in the user terminal according to an embodiment of the present invention as described above can enlarge, reduce, or move the drawn drawing by the multi-touch input only without a separate button input or a menu selection while the user is drawing the drawing. Further, the touch input apparatus according to an embodiment of the present invention allows the user to draw the drawing in a state where the enlargement, the reduction, or the movement has been performed, and more particularly, enables drawings before and after the enlargement to be naturally connected by simplifying the touch point sampling according to the enlargement magnification.

In the touch input apparatus according to an embodiment of the present invention, the touch input is processed according to the touch input event generated by the touch movement of the user, and a type and a generation order of touch input events by the user will be described below.

Figure 2:
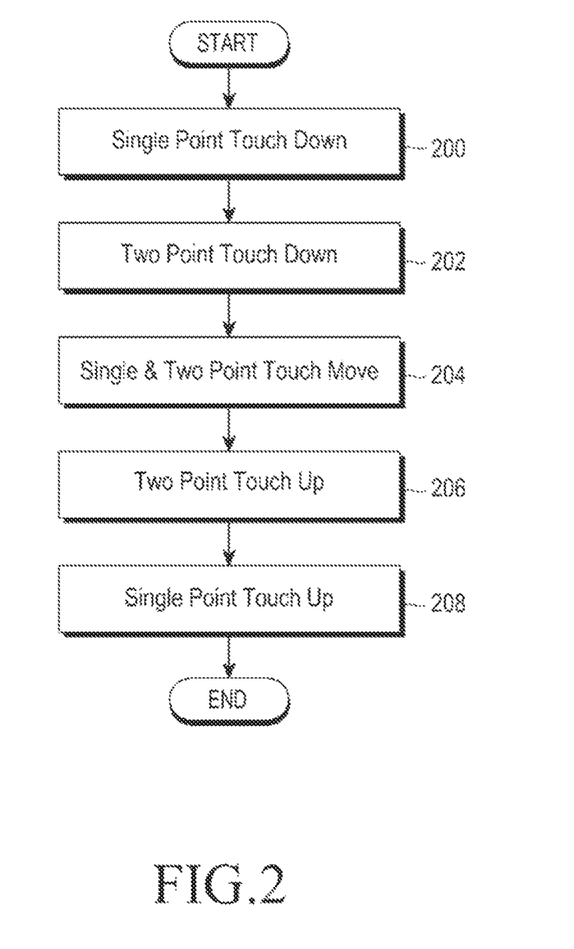
FIG. 2 illustrates an event generated according to a touch action of a user in a touch input apparatus according to an embodiment of the present invention.

FIG. 2 illustrates a touch input event generated along a touch movement by the user in a touch input apparatus according to an embodiment of the present invention. Referring to FIG. 2, as the user performs a touch on the touch input unit 12 by using an object such as a finger, a pen, a stylus or the like, the touch input unit 12 generates a Single Point Touch Down event in step 200. The Single Point Touch Down event is an event indicating that a single touch is input. If the single or multi touch determiner 22 determines that the touch input is the multi-touch input after the Single Point Touch Down event is generated, the single or multi touch input determiner 22 generates a Two Point Touch Down event in step 202. The Two Point Touch Down event is an event indicating that a multi-touch is input. When the touch input is not the multi-touch input, the Single Point Touch Down event is maintained.

When the user moves the object such as the finger, pen, stylus or the like while maintaining the touch in a state where the Single or Two Point Touch Down event is generated, the touch movement determiner 24 generates a Single Point Touch Move event and the multi-touch processor 27 generates a Two Point Touch Move event in step 204. The Single Point Touch Move event is an event indicating a movement by the single touch input, and the Two Point Touch Move event is an event indicating a movement by the multi-touch input.

When the touch is released from the touch input unit 12 after movement by the multi-touch, the touch input unit 12 generates a Two Point Touch Up event in step 206. The Two Point Touch Up event is an event indicating that the multi-touch input stops.

Further, when the touch is released from the touch input unit 12 after the movement by the single touch, the touch input unit 12 generates a Single Point Touch Up event in step 208. The Single Point Touch Up event is an event indicating that the single touch input stops.

Hereinafter, a process of processing the touch input according to the touch input event generated by the touch action of the user as described above will be described in more detail.

Figure 3:
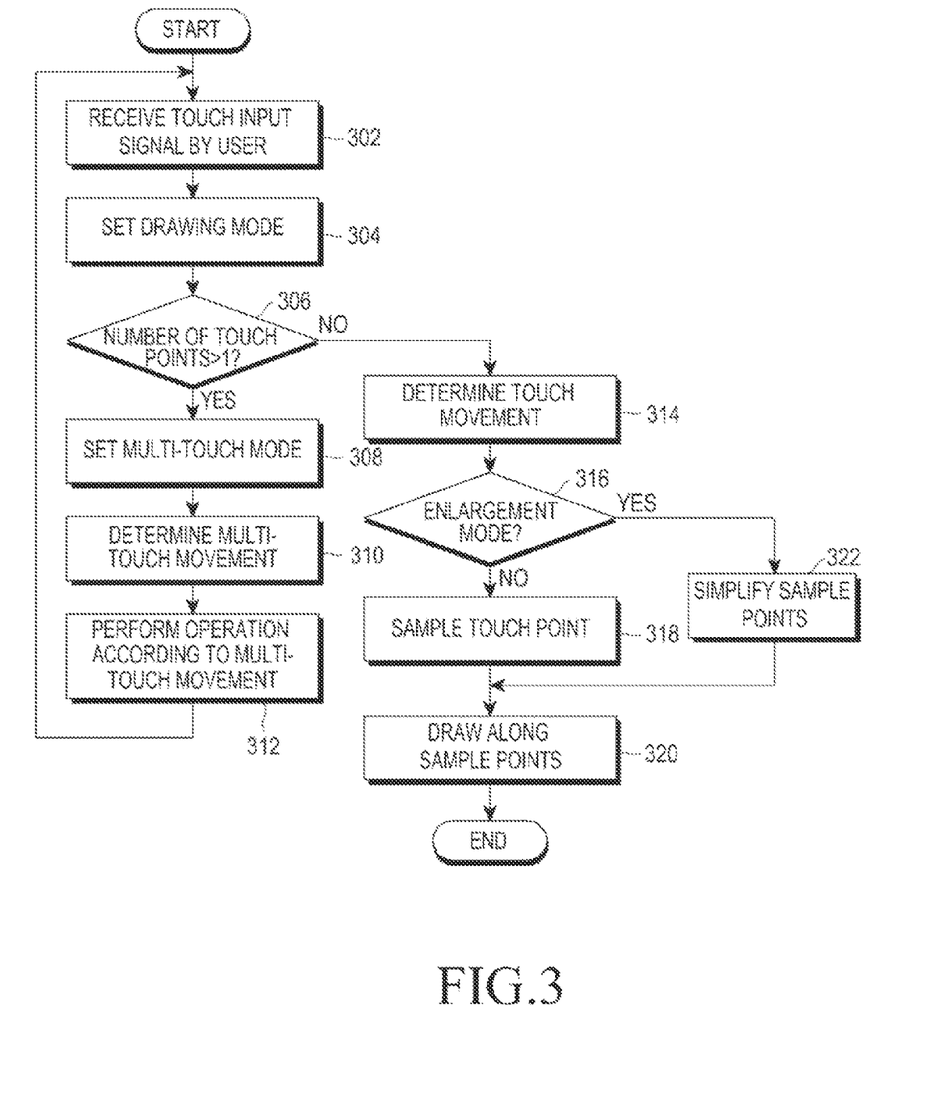
FIG. 3 is a flowchart of a touch input processing procedure in a touch input apparatus according to an embodiment of the present invention.

FIG. 3 is a flowchart of a touch input processing procedure in a touch input apparatus according to an embodiment of the present invention. Referring to FIG. 3, the touch input apparatus receives a touch input signal by the user according to the touch input event (Single Point Touch Down event) generated through the touch input unit 12 in step 302. Further, when the touch input signal is received, the touch input apparatus sets a drawing mode in step 304. The setting is performed to set the drawing mode as a basic mode and then switch the drawing mode to a touch mode.

After the drawing mode is set, the touch input apparatus determines whether the number of touch points is greater than "1" in step 306. When the number of touch points is greater than "1", the touch input apparatus sets the mode to the multi-touch mode in step 308. The multi-touch mode is a mode for performing an enlargement, a reduction, or a movement for the drawing which is being drawn. When the multi-touch mode is set, the touch input apparatus determines the multi-touch movement in step 310. The multi-touch movement may be an enlargement movement of increasing a distance between two touch inputs, a reduction movement of decreasing the distance between the two touch inputs, and a rotation movement of rotating the two touch inputs. The touch input apparatus performs a corresponding operation according to the multi-touch movement in step 312.

Figure 4A:
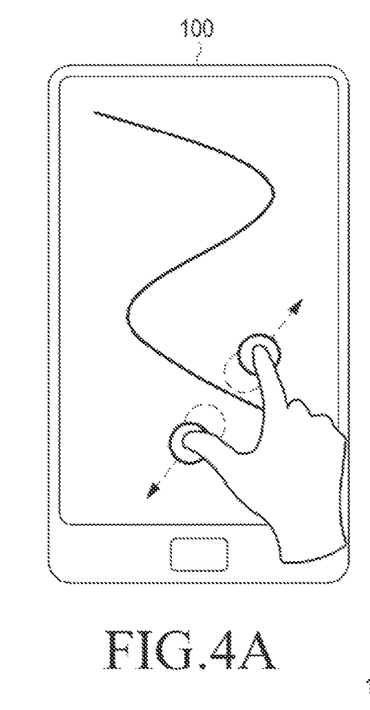
FIGS. 4A to 4C illustrate examples of enlargement, reduction, and movement operations according to a multi-touch movement in a user terminal according to an embodiment of the present invention.
Figure 4B:
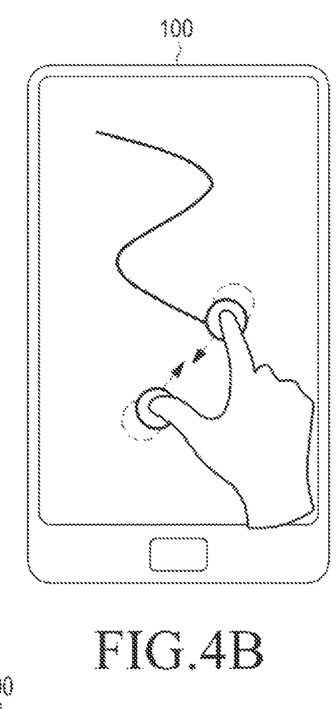
Figure 4C:
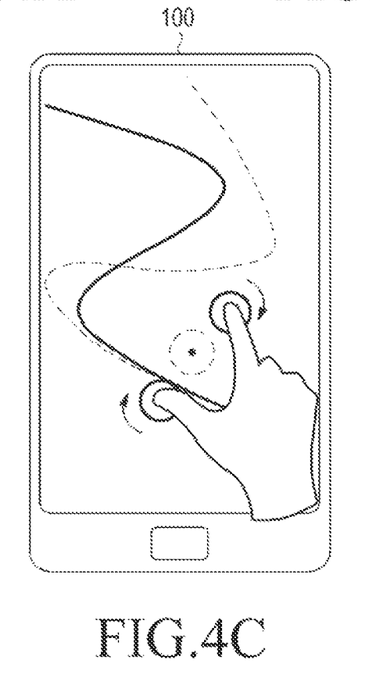

FIGS. 4A to 4C illustrate examples of enlargement, reduction, and movement operations according to a multi-touch movement in the user terminal 100 according to an embodiment of the present invention. FIG. 4A illustrates an example of a movement of increasing a distance between two touch inputs. As illustrated in FIG. 4A, when the movement of increasing the distance between the two touch inputs is determined, the touch input apparatus enlarges the size of the drawing displayed on the screen. FIG. 4B illustrates an example of a movement of decreasing the distance between the two touch inputs. As illustrated in FIG. 4B, when the movement of decreasing the distance between the two touch inputs is determined, the touch input apparatus reduces the size of the drawing displayed on the screen. FIG. 4C illustrates an example where the two touch inputs rotate about a center of the two touch inputs. As illustrated in FIG. 4C, when the two touch inputs rotate about the center of the two touch inputs, the touch input apparatus rotates the drawing displayed on the screen in a rotation direction indicated by the two touch inputs. The user can perform the touch input in a state where the screen size has been enlarged, reduced, or rotated, and draw a drawing according to the corresponding touch input.

Meanwhile, referring back to FIG. 3, when the number of touch points in step 306 is "1", the touch input apparatus determines the touch movement in step 314, and determines whether the touch movement is in the enlargement mode in step 316. When the touch movement is not in the enlargement mode, the touch input apparatus performs a touch point sampling according to the touch movement in accordance with a predetermined sampling reference in step 318. Further, the touch input apparatus provides the sampled points to the drawing module 30 to perform the drawing in step 320.

Figure 5:
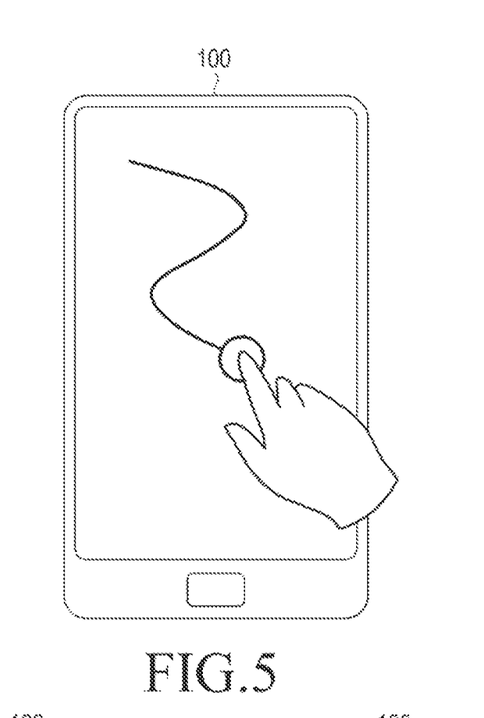
FIG. 5 illustrates an example of a drawing operation according to a single touch movement in a user terminal according to an embodiment of the present invention.

FIG. 5 illustrates an example of a drawing operation according to a single touch movement in the user terminal 100 according to an embodiment of the present invention. Referring to FIG. 5, when a movement is determined in a state where a single touch by the user is maintained, the touch input apparatus performs the drawing operation along the single touch movement.

Figure 6A:
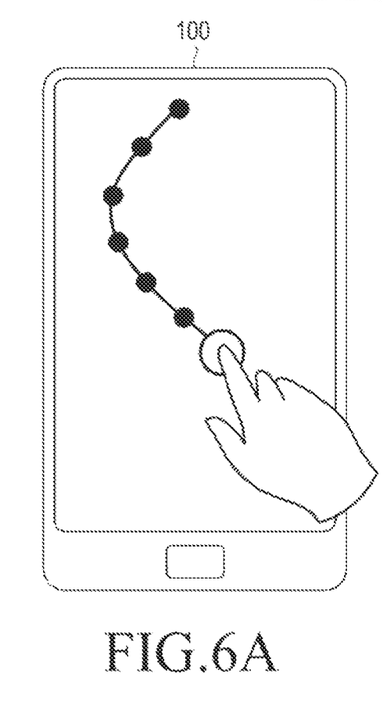
FIGS. 6A and 6B illustrate sample points in an enlargement mode after an enlargement and a drawing mode after a return according to an embodiment of the present invention.
Figure 6B:
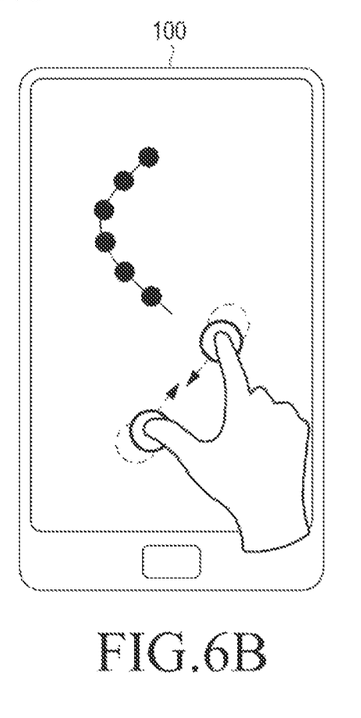

Meanwhile, referring again to FIG. 3, when the touch movement is in the enlargement mode as a result of the determination in step 316, the touch input apparatus proceeds to step 322 and simplifies the sample points according to an enlargement magnification. This is to remove duplication of the sample points which may be caused between the drawing mode and the enlargement mode. For a more detailed description, FIGS. 6A and 6B illustrate sample points in the enlargement mode (after the enlargement) and the drawing mode (after the return) according to an embodiment of the present invention. FIG. 6A illustrates the sample points in the enlargement mode, and FIG. 6B illustrates the sample points in the drawing mode.

A comparison between the sample points of FIGS. 6A and 6B will be described below. If the same sampling reference is used in both the drawing mode and the enlargement mode, when the enlargement mode is set back to the drawing mode, an interval between the sample points in the enlargement mode becomes much narrower than an interval between the sample points in the drawing mode. Accordingly, distortion occurs in the drawing in which the drawing operation is performed. Therefore, in an embodiment of the present invention, the touch input apparatus removes a difference between the drawings drawn in the drawing mode and the enlargement mode by simplifying the sample points according to the enlargement magnification in the enlargement mode.

Figure 7A:
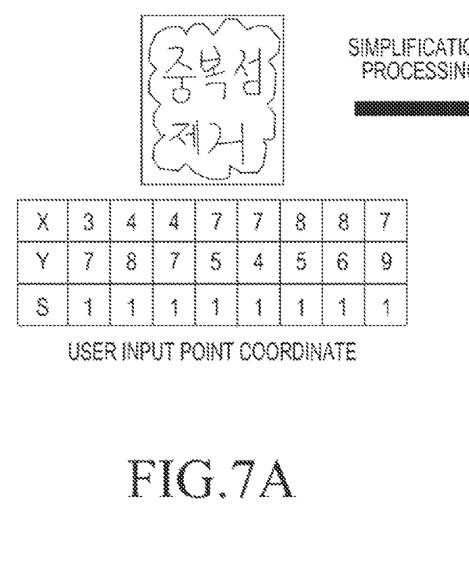
FIGS. 7A and 7B are views describing a sample point simplification according to an embodiment of the present invention.
Figure 7B:
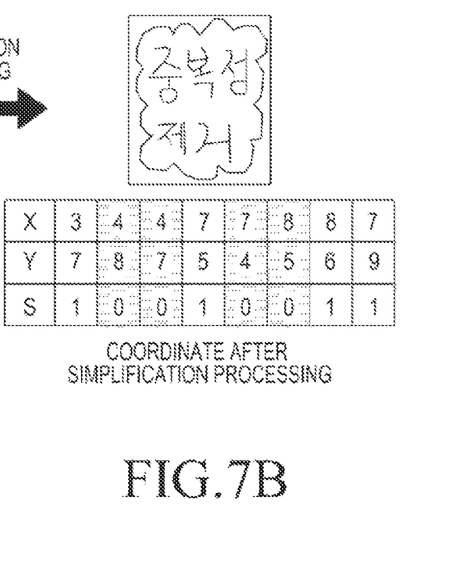

FIGS. 7A and 7B are views describing a sample point simplification according to an embodiment of the present invention. Referring to FIGS. 7A and 7B, FIG. 7A illustrates a user input point coordinate, and FIG. 7B illustrates a coordinate after a simplification processing. Referring first to FIG. 7A, a value S denotes a sample point and values X and Y denote coordinate values of the sample point. The simplification-processed sample points as illustrated in FIG. 7B may be obtained by removing sample points having a small difference between movement distances in an X direction and a Y direction from the user input point coordinate as illustrated in FIG. 7A. For example, FIGS. 7A and 7B illustrate that sample points of (4, 8) and (4, 7) coordinates, each having a distance difference of "1" in the X direction and the Y direction from a (3, 7) coordinate, are removed and sample points of (7, 4) and (8, 5) coordinates, each having a distance difference of "1" in the X direction and the Y direction from a (7, 5) coordinate, are removed. Accordingly, it is possible to prevent the drawing from being distorted during the drawing operation by removing duplicated sample points.

Various methods may be used as a simplification method to remove the duplicated sample points, and two methods, for example, a batch simplification method and an online simplification method may be used in an embodiment of the present invention. The batch simplification method corresponds to a method of performing a simplification in a state where the drawing has been completely drawn (a state where sampling has been completed), and the online simplification method corresponds to a method of performing a simplification in a state where the drawing is being drawn (state where sampling is being performed).

Figure 8:
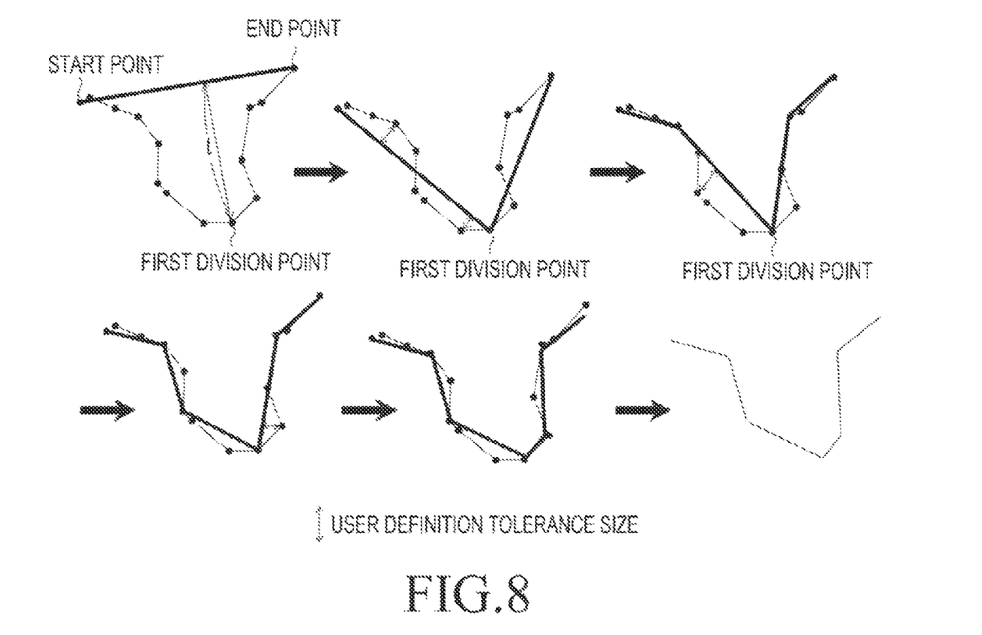
FIG. 8 is a view describing a batch simplification method according to an embodiment of the present invention.

A case where the batch simplification method is used will be first described. FIG. 8 is a view describing the batch simplification method according to an embodiment of the present invention. Referring to FIG. 8, when the batch simplification method is used, the sample point simplifying unit 28 calculates a distance t (Tolerance) between a line generated by connecting a start point and an end point of the sampling points and each sampling point, and sets a sampling point having a longest distance from the line as a first division point. Then, the sample point simplifying unit 28 calculates a distance between the first division point and each sample point, and sets a second division point. The sample point simplifying unit 28 sets first through nth division points until a value of t becomes less than or equal to a predetermined value by repeating such a process and removes the remaining points except for the first through nth division points, so that the sampling points may be simplified.

Figure 9:
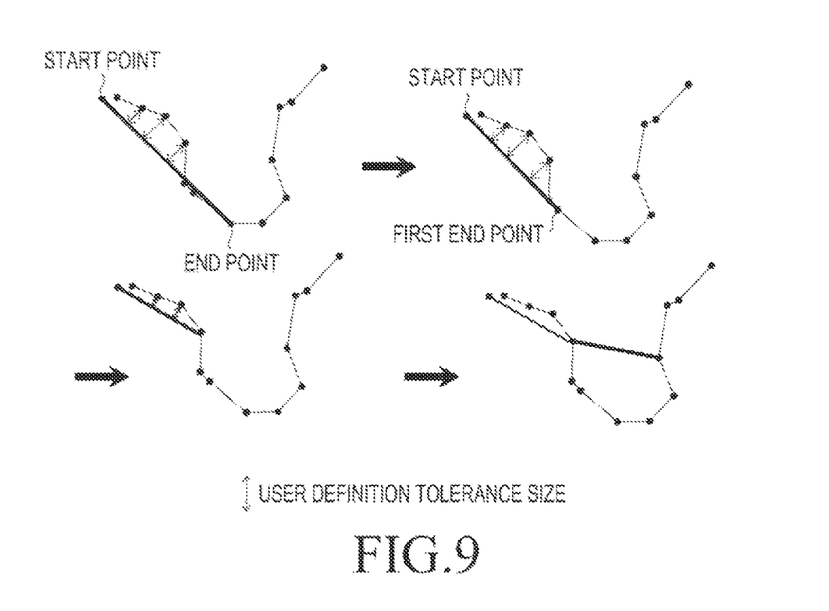
FIG. 9 is a view describing an online simplification method according to an embodiment of the present invention.

A case where the online simplification method is used will now be described. FIG. 9 is a view describing the online simplification method according to an embodiment of the present invention. Referring to FIG. 9, in the case where the online simplification method is used, when the sample point simplifying unit 28 has a buffer and the buffer is filled with a predetermined number of sampling points, the sample point simplifying unit 28 calculates a distance between a line generated by connecting a start point and an end point and each sample point between the start point and the end point, and sets a sample point, which has a distance from the line greater than or equal to a predetermined length and is closest to the end point, as a first end point corresponding to a next end point. Further, the sample point simplifying unit 28 calculates a distance between a line generated by connecting the start point and the first end point and each sample point between the start point and the first end point, and sets a sample point, which has a distance from the line greater than or equal to a preset length and is closest to the first end point, as a second end point corresponding to another next end point. In addition, the sample point simplifying unit 28 obtains first through nth end points until the distance between the line generated by connecting the start point and the end point and each sample point between the start point and the end point becomes a minimum distance by repeating such a process and removes the remaining points except for the start point and the first through nth end points, so that the sampling points may be simplified.

The touch input apparatus simplifies the sample points according to the above described methods in step 322 of FIG. 3, and then proceeds to step 320 and provides the sampled sample points to the drawing module 30 to display the drawing on the display unit 14.

Accordingly, the present invention easily performs enlargement, reduction, or movement during performing the drawing by a touch only without a separate mode switching or button and thus reduces user actions, which provides convenience to the user. Also, the present invention prevents a distortion phenomenon of a drawn drawing and reduces drawing errors by controlling sample points according to enlargement, reduction, or movement when the drawing is continued after the enlargement, the reduction, or the movement is performed while the drawing is performed.

While the present invention has been shown and described with reference to certain embodiments thereof, it will be understood by those skilled in the art that various changes in form and details may be made therein without departing from the spirit and scope of the present invention as defined by the appended claims. For example, although the batch simplification method and the online simplification method have been described as the sample point simplification method in the embodiments of the present invention, other methods of simplifying the sample points may be applied to the present invention.

What is claimed is:

1. A touch input apparatus in a user terminal, comprising:
a display screen for receiving a touch input according to a touch of a user;
a processor for entering a drawing mode according to the touch input, determining one of a single touch input and a multi-touch input, performing a touch point sampling according to a single touch movement when there is a single touch input and providing a sample point, performing drawing on the display screen along the sample point, entering a multi-touch mode when there is a multi-touch input, and performing a multi-touch action including at least one of an enlargement, a reduction, a movement of a drawing displayed on the display screen according to a multi-touch movement, performing a simplification for the sampled sample points in accordance with a sampling rate of the sampled touch point before the enlargement according to an enlargement magnification, and providing the simplified sample points when the single touch movement is generated in a state of the enlargement.

2. The touch input apparatus of claim 1, the processor further comprising a drawing unit for performing the drawing by using the provided sample points.

3. The touch input apparatus of claim 1, wherein the touch point sampling simplifying unit performs the simplification for the sampled sample points by using a batch simplification method.

4. The touch input apparatus of claim 1, wherein the touch point sampling simplifying unit performs the simplification for the sampled sample points by using an online simplification method.

5. A touch input method in a user terminal comprising:
receiving a touch input on a display screen according to a touch of a user;
entering a drawing mode according to the touch input and determining one of a single touch input and a multi-touch input;
performing a touch point sampling when there is a single touch input and providing a sample point and performing drawing along the sample point;
entering a multi-touch mode and performing a multi-touch action including at least one of an enlargement, a reduction, and a movement of a drawing displayed on the display screen according to a multi-touch movement when there is a multi-touch input; and
when the single touch movement is generated in a state of the enlargement performing a simplification for the sampled sample points in accordance with a sampling rate of the sampled touch point before the enlargement according to an enlargement magnification and providing the simplified sample points.

6. The touch input method of claim 5, further comprising performing the drawing by using the provided sample points.

7. The touch input method of claim 5, wherein performing the simplification for the sampled sample points comprises performing the simplification for the sampled sample points by using a batch simplification method.

8. The touch input method of claim 5, wherein performing the simplification for the sampled sample points comprises performing the simplification for the sampled sample points by using an online simplification method.

* * * * *